Nov. 29, 1966     L. McDILL     3,287,873
LIGHT REGULATING PANEL SCREEN
Filed Jan. 20, 1964     2 Sheets-Sheet 1
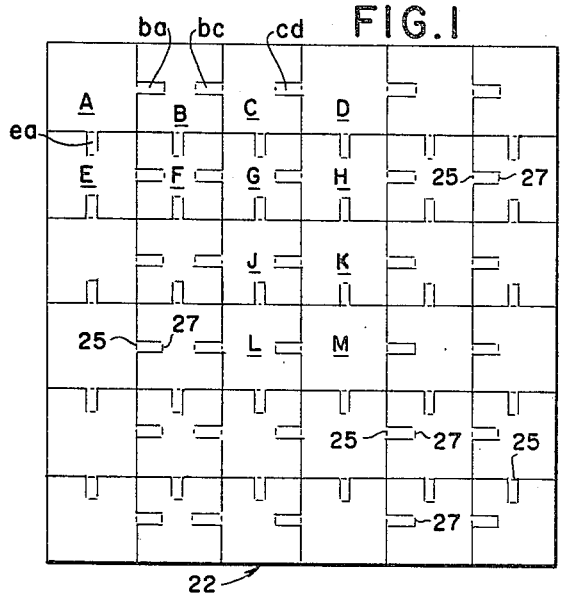
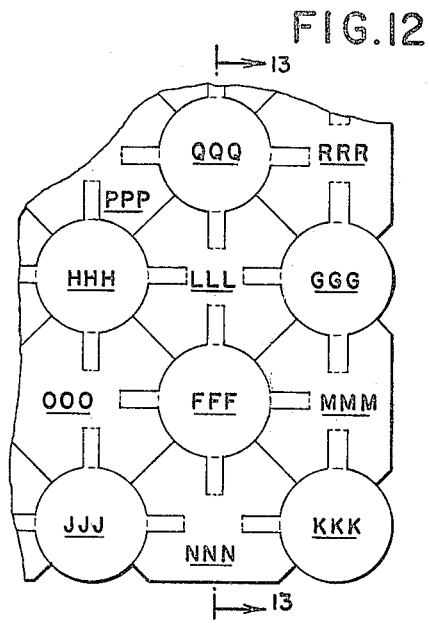
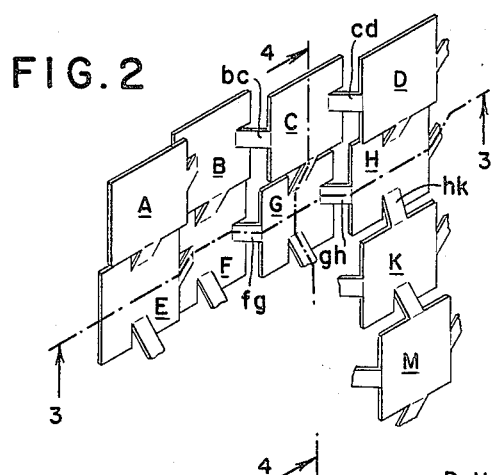
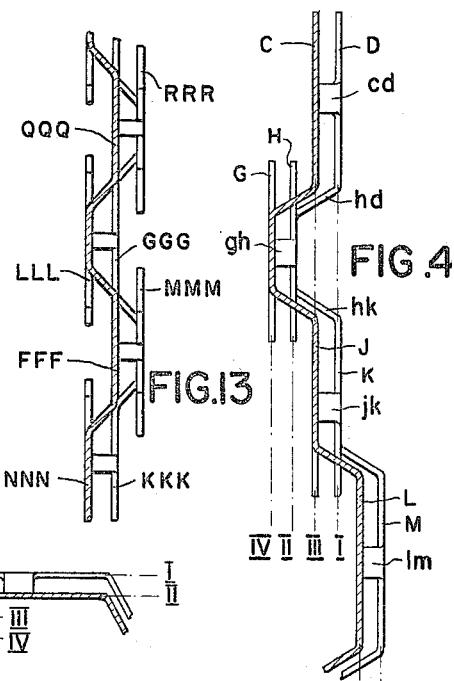
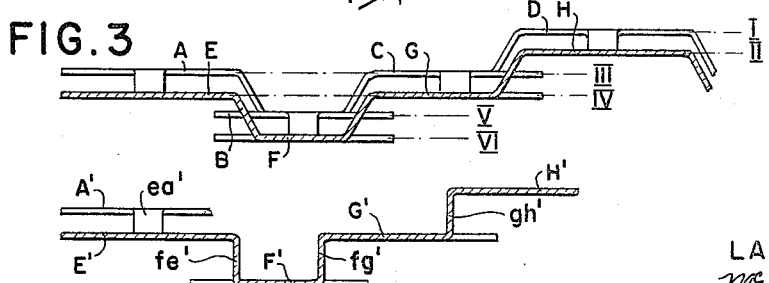
INVENTOR.
LAURA McDILL
BY McLean and Boustead
ATTORNEYS Nov. 29, 1966 L. McDILL 3,287,873
LIGHT REGULATING PANEL SCREEN
Filed Jan. 20, 1964 2 Sheets-Sheet 2
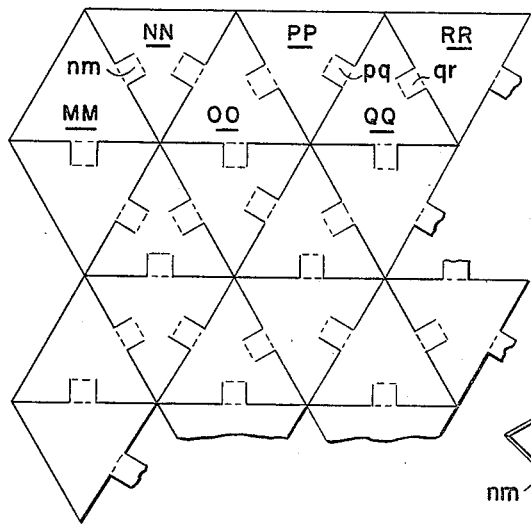
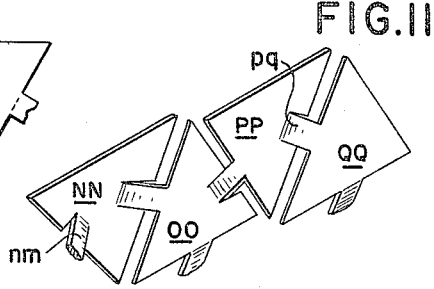
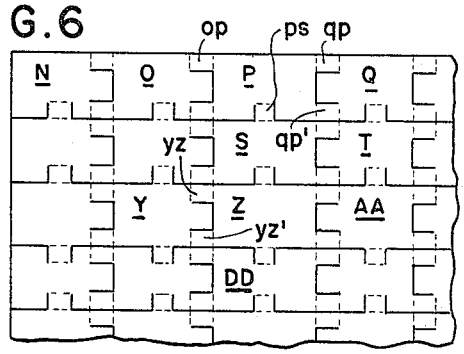
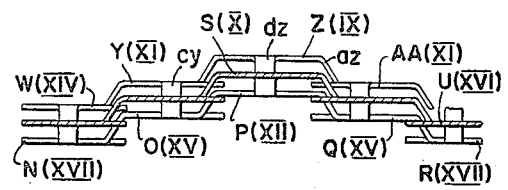
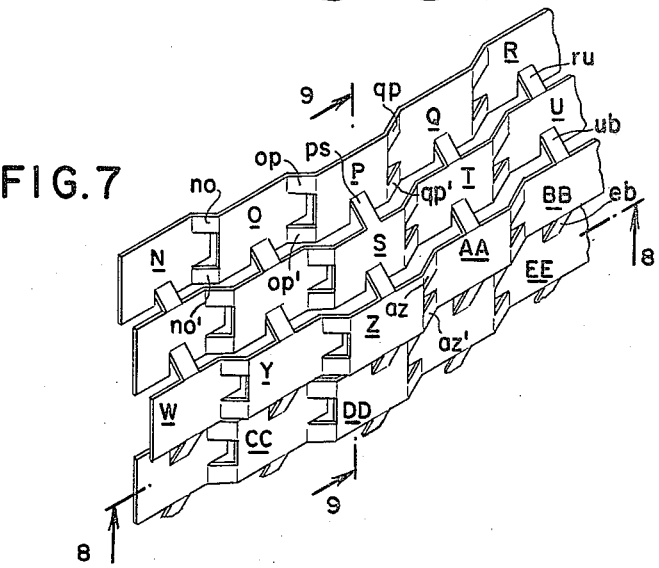
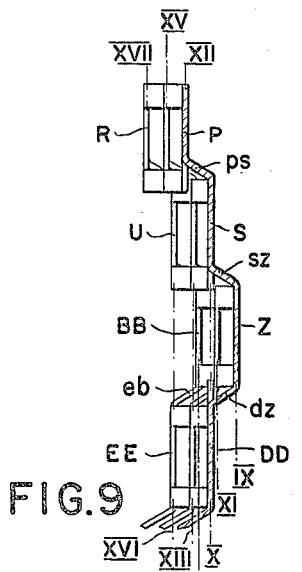
INVENTOR.
LAURA McDILL
BY McLean and Bouska
ATTORNEYS United States Patent Office 3,287,873
Patented Nov. 29, 1966

3,287,873
LIGHT REGULATING PANEL SCREEN
Laura McDill, R.F.D. 1, Woodstock, Vt.
Filed Jan. 20, 1964, Ser. No. 338,840
8 Claims. (Cl. 52—675)

This invention relates to a screen panel designed to cut-off or otherwise regulate transmission of light and/or heat waves without undue interference with air circulation, sound transmission, etc. The screen finds utility as an artificial light screen, as a sun-screen, but also can be used in certain other wall or semi-wall partition applications, such as room dividers, to give visual privacy without substantial loss of air circulation, etc. The screen panel of this invention comprises, as major elements, an interconnected plurality of platelets which define a finite plurality of planes which generally are substantially parallel to each other and also, usually, to the plane of the panel. The platelets generally "overlap" each other and thus, when made from opaque material, can provide for complete cutting off of direct rays normal to the planes of the panel while allowing transmission of softer, and generally cooler, reflected rays. The screen permits transmission of some direct rays which impinge on the screen at angles other than 90°, the amount of such rays being dependent on the amount of "overlap" of the platelets in one plane across the margins of the platelets of separate but adjacent planes and also upon the distance between planes. In some embodiments of this invention all the platelets are confined to two planes, providing "holes" through one plane which are covered, with some overlap, by the platelets of the other plane which have a shape roughly similar to the holes in the other plane. When the platelets are made of tinted transparent or translucent material, the sceen can also provide for interception of undesirable direct rays, thus giving more complete control of the waves transmitted than other devices known to the art.

In the screen panel of this invention, the platelets are joined to each other by tabs formed integrally with the platelets, thus providing for manufacture of the screen from a single sheet of stock. The screen panel will generally be made from opaque, relatively rigid, sheet materials, but transparent or translucent materials also may be employed. When manufactured from a single sheet of stock a certain flexibility is also required in the stock. Metals such as steel, aluminum, etc., are the preferred construction materials but thermoplastic and other resins such as polyvinyl chloride, melamine, etc., fibrous materials such as cardboard and stock which incorporates one or more of the above as epoxy-bonded fiberglass, asbestos filled vinyl, plastic-clad steel and the like may be employed, as desired. Also, it is within the scope of this invention to coat the fabricated screen panel with protective or decorative finishes.

The invention will be better understood by reference to the accompanying drawings in which:

FIGURE 1 represents a sheet of stock cut in a manner suitable for making a screen panel according to this invention, having substantially square platelets;

FIGURE 2 is a perspective view of a screen panel having square platelets and diagonal tabs formed from the cut sheet of FIGURE 1;

FIGURE 3 is a cross-sectional view of the screen of FIGURE 2 along the line 3—3 of FIGURE 2;

FIGURE 4 is a cross-sectional view along the line 4—4 of FIGURE 2;

FIGURE 5 is a cross-sectional view similar to that of FIGURE 3 of a screen having perpendicular tabs;

FIGURE 6 shows a sheet of stock prepared for forming a sheet having rectangular platelets;

FIGURE 7 is a perspective view of a screen panel made from the stock of FIGURE 6, with some platelets added;

FIGURE 8 is a view along the line 8—8 of FIGURE 7;

FIGURE 9 is a view along the line 9—9 of FIGURE 7;

FIGURE 10 is a sheet of stock cut to prepare a screen panel having triangular platelets;

FIGURE 11 is a perspective view of part of the top row of triangular platelets in a screen panel made from the cut stock of FIGURE 10;

FIGURE 12 is a sheet of stock cut to prepare a screen panel having alternating circular platelets; and FIGURE 13 is a view along the line 13—13 of part of a screen panel made from the cut stock of FIGURE 12.

In the drawing of FIGURE 1, substantially square platelets A–M, etc., have been cut into the sheet of stock 22 and cuts have been made into platelets B, C, E, F, G, H, J, K, L, etc., to provide tabs connecting the platelets. These tabs have been indicated in all of the drawings, where practical, by two letter codes, such as $ba$, $gh$, etc., where the first letter in each tab identification indicates the platelet from which the tab is cut and the second letter indicates the adjoining platelet. Also indicated in FIGURE 1 are peripheral fold lines 25, which are at the periphery of the platelets and interior fold lines 27 which are located interiorly of the platelets. The cuts extend, in each situation, from a fold line 25 to a fold line 27 and the distance between fold lines may be chosen to give maximum interplanar distances when the tabs are to be perpendicular to the major planes, as shown in FIGURE 5, but the tabs will not be so long as unduly to weaken the platelets from which they are cut.

Folding is performed in such manner that the fold at one end of each tab is opposite the fold at the other end of the tab, putting adjacent platelets into different, substantially parallel planes, I, II, III, IV, etc. as shown in FIGURE 3. As shown in FIGURES 2–4, the final position of the tabs is usually diagonal to these major planes, but when greater air circulation, for example, is desired, the folds can be 90° bends, putting the tabs perpendicular to the major planes as shown in FIGURE 5. As can be seen from FIGURES 2–4, the bending of the tabs does not require each row of platelets to be in a plane forward of its adjoining row, but rather permits stepping back of the planes in a succeeding row to confine the planes defined by the platelets to a finite number which is independent of the length of the screen panel, that is, the number of rows employed in any particular screen panel. Thus, the screen of this invention may readily be provided with framing members of discrete size which will define a general plane for the entire screen panel, generally parallel to the major planes defined by the platelets.

In FIGURE 6, rectangular platelets N–DD, etc. have been cut into the sheet of stock 23 and cuts have been made into platelets N, O, P, Q, S, T, etc. to provide tabs connecting the platelets, one tab connecting the platelets in a vertical direction and two tabs connecting the platelets in a horizontal direction. These tabs also have been indicated in the drawings by two letter codes such as *op, ps, qp* and *qp'*, where the first letter in each tab identification indicates the platelet from which the tab is cut and the second letter indicates the adjoining platelet, the prime on the letter indicating the second tab cut from the same platelet. Also, as indicated in FIGURES 1–5, the peripheral and the interior fold lines are indicated by dotted lines.

Similarly, FIGURES 10 and 11 show a sheet cut with triangular platelets and a section of the corresponding screen panel from which it is made, and FIGURES 12 and 13 show a sheet cut to provide non-contiguous circular platelets together with a portion of the corresponding screen panel from which it is formed. It is to be noted that the platelets are so cut in FIGURE 12 that all of the tab portions are external of the circular platelets so that the screen panel shown in FIGURE 13 is in only three planes.

In the screen panel of this invention, the platelets are arranged in crossing rows in two or more directions, such as vertical and horizontal rows, or the rows may be at angles of, say, 45° and 60° from the horizontal. Each platelet is off-set from, but is fastened to, each adjoining platelet in its row and occupies a different plane from each lateral neighbor, generally a parallel plane. Further, the margin of each platelet overlies or underlies the margin of each platelet adjacent to it in any row. The off-set platelet may be in substantially the same plane as its diagonally adjacent neighboring platelet and when such is the case the platelets will have abutting margin surfaces which can be fastened together by any suitable means known to the art, for example, by welding, to give greater structural stability to the screen panel.

The platelets lie in a plurality of planes, at least two planes, throughout a screen panel. More usually, three or more planes will be formed, the greater number of planes providing, in general, for greater transmission of slanted rays. Often, the screen panel will consist of a central plane comprising diagonally adjoining platelets, abutting each other at their corners, while platelets laterally adjacent to the contacting platelets in their respective vertical or horizontal rows are in planes forward of or behind this central plane. It does not, however, depart from the spirit of this invention to have more planes, but such an arrangement may cause the screen to occupy a greater volume of space than is desired.

The platelets can be simple plane polygons, such as triangles, hexagons, squares and rectangles. Also, it is advantageous to have platelets of substantially uniform size and shape throughout each screen panel. It does not depart from the spirit of this invention, however, to have platelets of more complex configuration including platelets having curved edges, and/or curved surfaces. These platelets are at least symmetrical and in such embodiments, laterally adjacent platelets in a row will have shapes which complement rather than repeat each other and the sizes may vary, although uniformity of design will generally require diagonally adjacent platelets to be congruent throughout some or all of the extent of a screen panel. Each platelet is connected to all of its laterally adjacent platelets and the connecting member preferably is as slender as the strength of the material worked with will permit. Generally the width of the connecting member will be less than one-half the length of the side of the platelet from which it is formed preferably less than one-third. In the case of platelets having curved sides, the total width of connecting members will generally be less than one-quarter or even one-sixth of the total perimeter of the platelet. Sometimes it is desirable to have two or more connecting members between adjacent platelets.

In the preferred manufacturing procedure according to this invention, a sheet of suitable flat stock is cut to divide it into a plurality of contiguous platelets, of the desired shape, except for a small portion of the periphery of each platelet. Since each platelet is to be joined to all adjacent platelets in the two or more rows containing the platelet, the platelets interior of the margin platelets of a screen panel will be spared cutting at at least two points on the periphery of each platelet. Thus the interior platelets will be joined to at least two adjacent platelets, more usually, since vertical and horizontal rows are preferred, to three or four adjacent platelets. Platelets at the edges or margins of the panel, since they form the ends of rows, will generally have one less connection while the platelets at the corners will have two less connections. Secondary cuts are made inwardly from the edge of one of each adjacent pair of platelets to define a tab portion preferably extending outwardly from the edge of one of the adjacent pair of platelets and inwardly from the edge of the other of the pair of platelets. These secondary cuts are generally parallel to each other and generally are close to each other as the material worked with will permit without providing an unduly weak connecting portion. The uncut peripheral portion and the interior end of the secondary cuts provide fold lines and at least two of the fold lines associated with each platelet are parts of intersecting lines.

Good design will often dictate that some platelets not be cut at all but rather have tabs radiate out from each side. This integrity is especially desirable in platelets in the front-most and rear-most planes. For ease of manufacture it may be desirable to cut all of the tabs in a row from platelets in a row.

After tab portions have been cut, the stock is folded at the end of each tab portion in opposite directions. This folding puts one of each adjacent pair of platelets in a different plane spaced apart from its adjacent platelet and the foreshortening in the surface dimension of the tab by its conversion to a direction diagonal or even normal to the plane of the screen results in overlapping, in a plurality of planes, of the margins of adjacent platelets.

It can thus be seen that this invention provides a screen panel composed of rows of platelets in which the individual platelets lie in planes spaced from and generally parallel to platelets adjacent to them in each row. The margins of each platelet overlap the margins of these adjacent platelets providing for interception of all light rays perpendicular to these planes. The invention also provides a method for manufacturing such screen panels from single sheets of stock by a simple cutting and folding operation.

I claim:

1. A screen panel cut from a sheet of flat material having a plurality of plane surfaces lying in different planes composed of a plurality of platelets, certain of said platelets extending about the periphery of the panel and the remaining platelets being located interiorly of these, at least three platelets being disposed about each interior platelet adjacent thereto, each platelet being connected to at least one adjacent platelet and each interior platelet being connected to at least two adjacent platelets, the connection between each connected adjacent pair of platelets including a tab portion cut from the pair of platelets and integrally joined at its opposite ends to each one of the pair of platelets, the tab portion being folded at each end thereof in opposite directions whereby the pair of adjacent platelets is held spaced apart with their surfaces lying in different planes and with the marginal portion of one of the pair of adjacent platelets underlying the marginal portion of the other of the pair of platelets, the folding line of a tab portion connected to each interior platelet at the connection of such tab portion to such platelet intersecting the folding line of at least one other tab portion at the connection of such tab portion with the same platelet.

2. The screen panel of claim 1 wherein the platelets are polygons with straight sides.

3. The screen panel of claim 1 wherein all of the platelets are squares.

4. The screen panel of claim 1 wherein all of the platelets are rectangles.

5. The screen panel of claim 1 wherein all of the platelets are triangles.

6. The screen panel of claim 1 wherein platelets have curved sides.

7. The screen panel of claim 1 in which all platelets are disposed in two planes.

8. The screen panel of claim 7 wherein diagonally adjacent platelets are fastened at their margins.

References Cited by the Examiner

UNITED STATES PATENTS

| | | | |
|---|---|---|---|
| 1,983,412 | 12/1934 | Smith | 29—6.1 X |
| 2,925,634 | 2/1960 | Ewing | 52—473 X |
| 3,111,204 | 11/1963 | Phare | 52—635 |
| 3,191,728 | 6/1965 | Daird | 52—473 |
| 3,197,820 | 8/1965 | Au Clair et al. | 52—473 |

FRANK L. ABBOTT, *Primary Examiner.*

M. O. WARNECKE, *Assistant Examiner.*